July 11, 1967
A. L. NASVYTIS
3,330,171
BEARINGLESS ROLLER GEAR DRIVE
Filed May 19, 1964
6 Sheets-Sheet 1
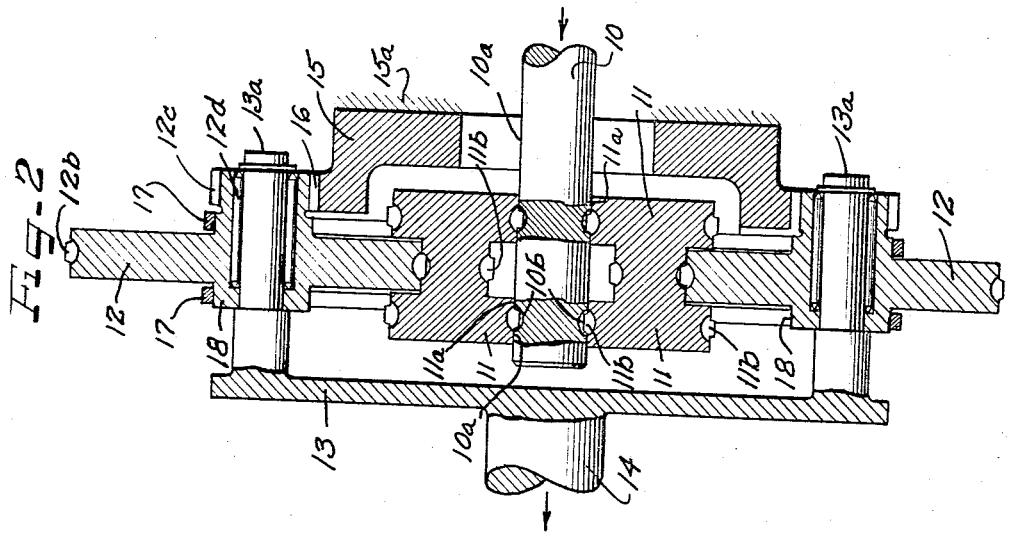
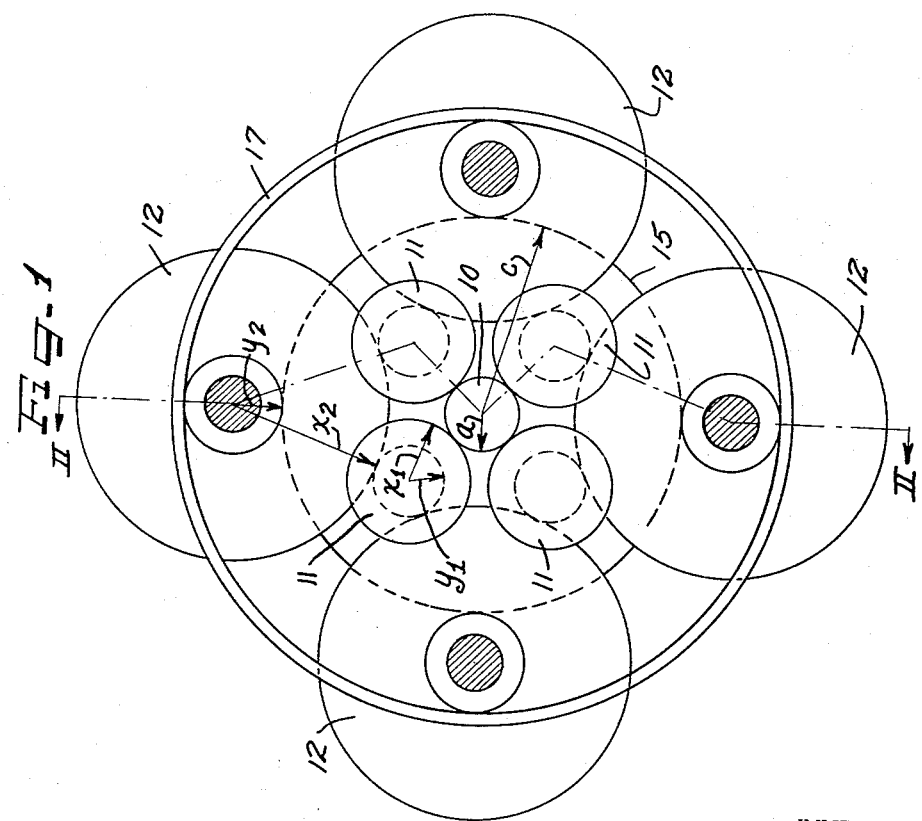
INVENTOR.
Algirdas L. Nasvytis
BY
ATTORNEYS

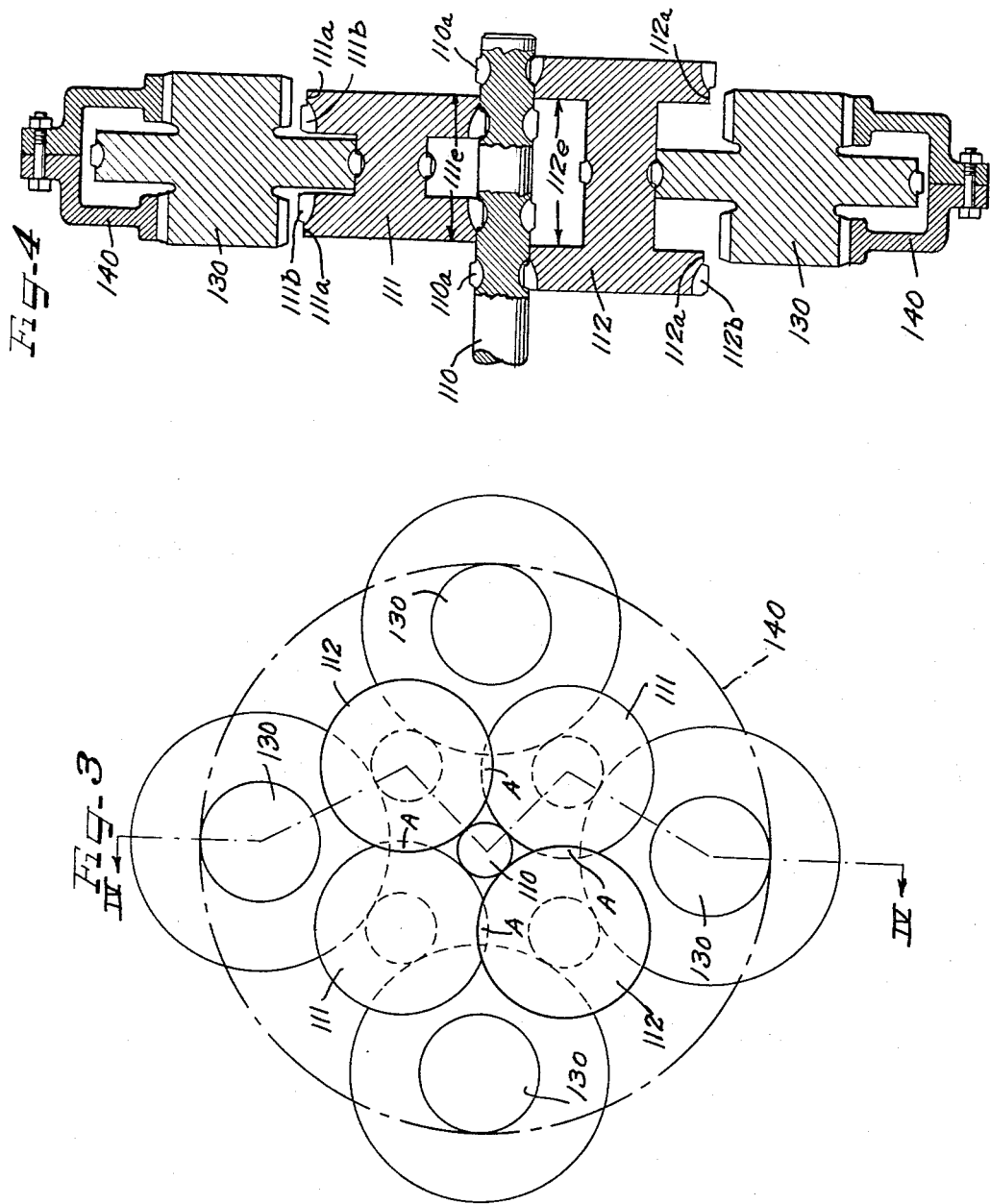

July 11, 1967
A. L. NASVYTIS
3,330,171
BEARINGLESS ROLLER GEAR DRIVE
Filed May 19, 1964
6 Sheets-Sheet 3
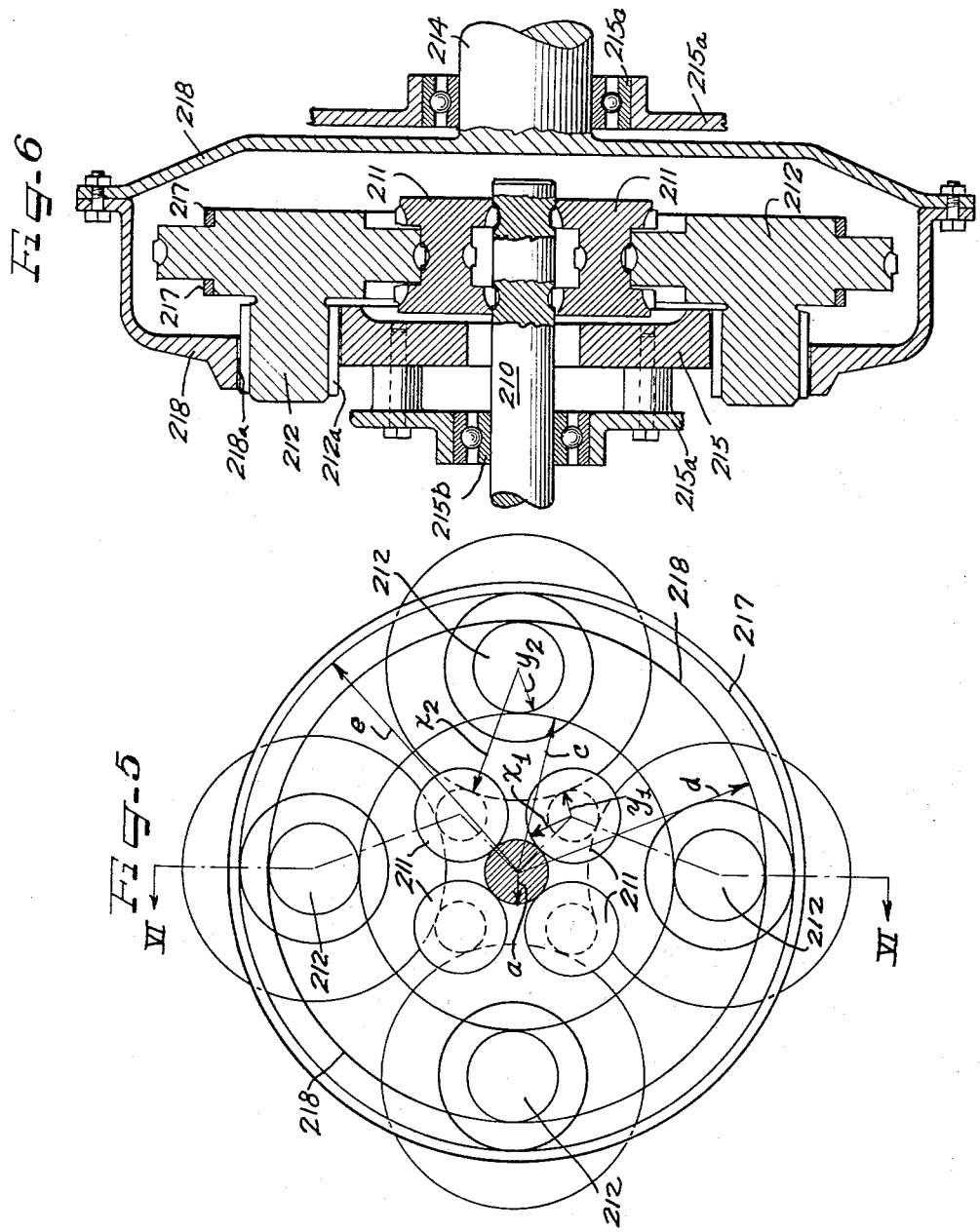
INVENTOR.
Algirdas L. Nasvytis
BY
ATTORNEYS

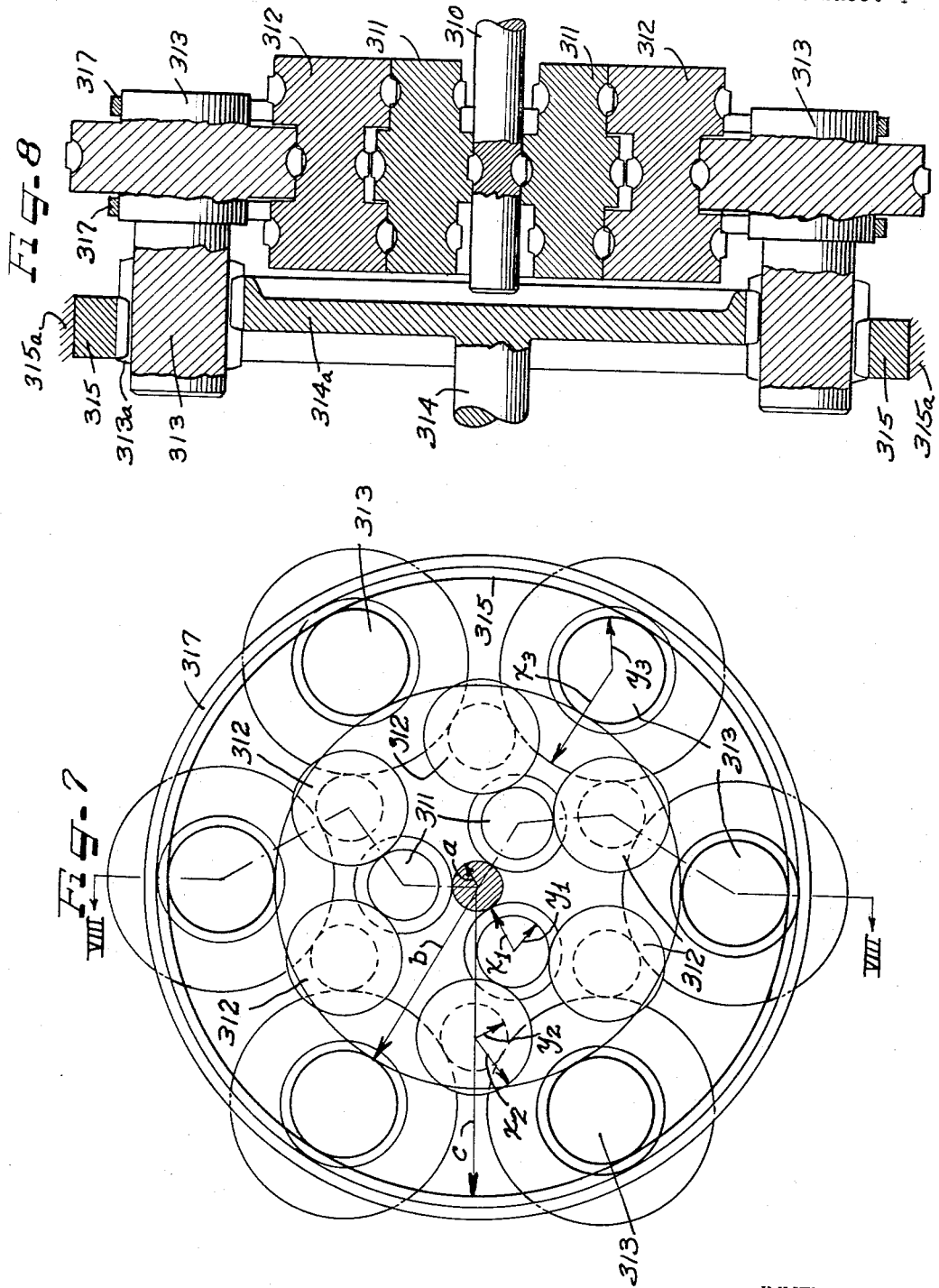

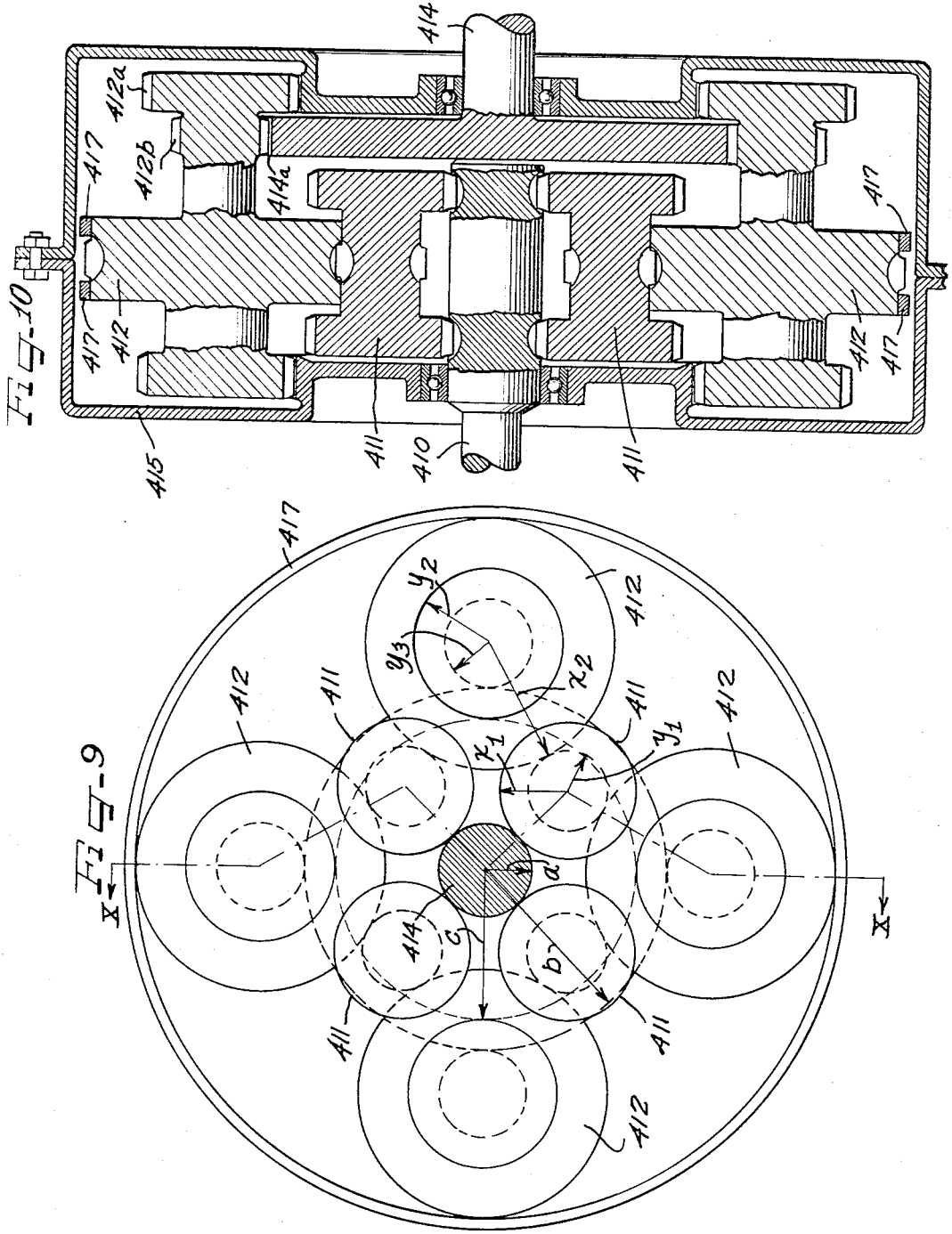

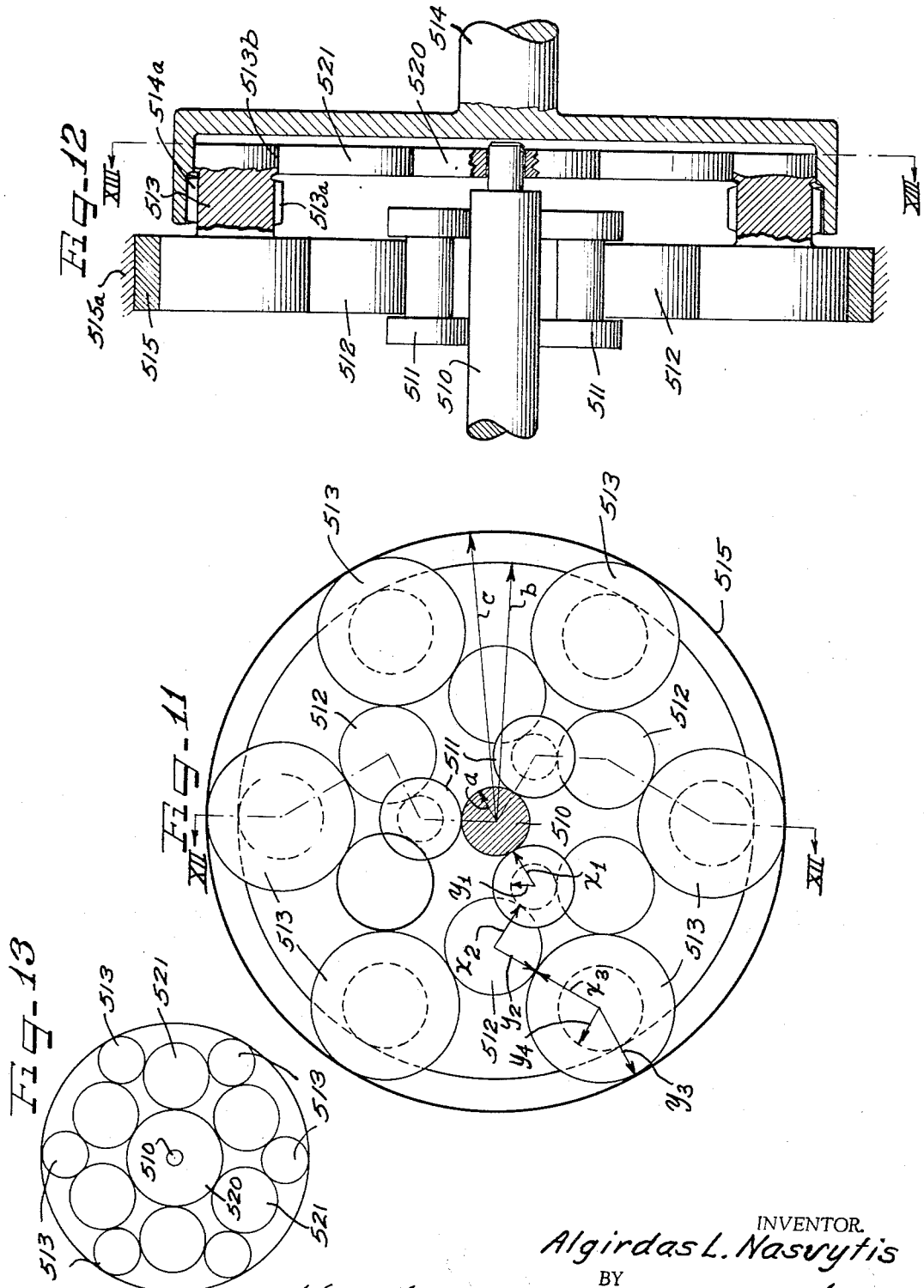

United States Patent Office 3,330,171
Patented July 11, 1967

3,330,171
BEARINGLESS ROLLER GEAR DRIVE
Algirdas L. Nasvytis, Cleveland, Ohio, assignor to
TRW Inc., a corporation of Ohio
Filed May 19, 1964, Ser. No. 368,592
10 Claims. (Cl. 74—801)

The present invention relates to planetary gear devices and is more particularly concerned with the provisions of further improvements in planetary gearing systems. Basically, it is an expanded concept of planetary gear drive wherein more than one row of gear planets is employed in the space between the sun input gear and output ring gears.

In accordance with the present invention, each planet of each planet row is a stepped gear of a balanced design. Each comprises two axially spaced gears of one diameter separated by one gear of different diameter. In the first row of the planets the two gears of the one diameter comprise the larger gears and are in contact while the input sun gear and the middle gear has a smaller diameter that contacts the next row of planets. For any sequential row of planets, the larger gear diameter is the input and the smaller the output. In such arrangement each stepped gear planet is a reduction unit with a ratio $x/y$ where $x$ is a pitch radius of larger gear and $y$ is a pitch radius of smaller gear. A drive with three rows of stepped planets has a total reduction ratio $$R = \frac{c x_1 x_2 z_3}{a y_1 y_2 y_3}$$

where $c$ is the ring gear pitch radius and $a$ is the sun gear pitch radius. In any row, the planets can be without stepped gears, or, in other words, of a single diameter; but in such case, the gears are then only idlers and do not directly affect the reduction ratio.

In a system having three rows of planets, only one row of planets needs bearings to take torque reaction in the case of the stationary planets or to take output in the case of rotating planets. The most convenient location for such bearings is the last row of planets. The planets of the remaining rows rotate without the need for bearings. They are supported on cylindrical surfaces associated with each gear, usually at both sides of each gear. These cylindrical surfaces have a diameter exactly equal to the pitch diameter of the associated gear. Each planet has at least three contact points with the angle of arc between adjacent points being less than 180° in each case. These three contacts locate the planet in space but do not interfere with rotation which is in accordance with almost pure rolling contact. The gears act to transfer the torque and the cylindrical surfaces perform the bearing support functions.

An object of the present invention is to have rotating planetary roller clusters with only two rows of intermediate planets.

A further object of the present invention is to provide a planetary multiroller gear transmission system, incorporating a very substantial reduction in space and in weight by use of mutually overlapping compound planet gear members.

A still further object of the present invention is to provide planetary gear systems employing annular free wheeling bearing rings as a means of providing transmission preload or more than one bearing rings outwardly facing bearing surfaces of one or more rows of planet members.

A still further object of the present invention is to provide a bearingless planetary gear transmission system.

It is, accordingly, an object of the present invention to provide planetary gear systems employing annular free-wheeling bearing rings as means providing transmission preloading.

Another object of the present invention is to provide an improved transmission system of the planetary type in which an even number of rows of planets, for example, two rows, may be employed.

Still a further object of the present invention is to provide a bearingless planetary gear transmission system.

A feature of the invention resides in the provision of one or more annular free-wheeling bearing rings in preloaded position contacting the bearing surfaces of one or more rows of planet members in a plentary gear system.

Yet another feature of the invention resides in the provision of a multiroller gear system employing mutually overlapping compound planet gear members providing a reduction in weight and space required.

Still another feature of the invention is the provision of a substantially force-balanced planetary gear system in which the output forces are removed from one or more rows of planet gears at points axially removed from the input directed to such planet gears.

Yet a further feature of the invention resides in the provision of radial force balancing means providing substantially zero moment with respect to forces imposed upon the output planets of a planetary gear system.

Still other and further objects and features of the invention will at once become apparent to those skilled in the art from a consideration of the attached drawings and specifications wherein several embodiments of the invention are shown by way of illustration only, and wherein:

FIGURE 1 comprises an end-elevational view in partial cross-section of a planetary gear system constructed in accordance with the principles of the present invention;

FIGURE 2 is a side-elevational view in cross-section taken along the line II—II of FIGURE 1;

FIGURE 3 is an end-elevational view in partial cross-section fragmentarily illustrating a component positioning aspect of the present invention;

FIGURE 4 is a cross-sectional view taken along the line IV—IV of FIGURE 3;

FIGURE 5 is an end-elevational view in partial cross-section of a further modified form of the present invention;

FIGURE 6 is a cross-sectional view taken along the line VI—VI of FIGURE 5;

FIGURE 7 is still a further modified form of the present invention shown in end-elevational view, in partial cross-section;

FIGURE 8 is a side-elevational view of the embodiment shown in FIGURE 7 taken along the lines VII—VIII;

FIGURE 9 is still a further embodiment of the present invention shown in end-elevational view in patrial cross-section with the outer fixed housing removed;

FIGURE 10 is a cross-sectional view taken along the line X—X of FIGURE 9 and including the outer fixed housing;

FIGURE 11 is an end-elevational view, partially diagrammatically shown, illustrating still a further embodiment of the present invention;

FIGURE 12 ccmprises a side-elevational view in cross-section taken along the line XII—XII of FIGURE 11; and FIGURE 13 comprises an end-elevational view, partially diagrammatically shown, taken along the line XIII—XIII of FIGURE 12.

As shown on the drawings:

Considering the present invention, attention may be directed to the first embodiment illustrated in FIGURES 1 and 2. As there shown, an input shaft 10 acts as a sun member component of a planetary system in which planet rollers 10 combine with planet rollers 12 carried by carrier 13 directly connected to output shaft 14. As shown, a stationary ring gear member 15 is provided with radially outwardly facing gear teeth 16 for cooperation with the planet 12. A pair of annular free-wheeling rings 17 is provided for co-operation with the peripheral surfaces 18 of planets 12. In the form illustrated, the power transmission drive connections between adjacent planets and the sun gear member comprise combination friction and tooth gearing components in the manner illustrated in my copending United States application Ser. No. 237,630, filed Nov. 14, 1962. In such systems, and as is the case in the present embodiment, each tooth gear element is combined with at least one annular friction surface having a diameter equal to the pitch diameter of the tooth portion thereof. To avoid confusion, all end views of gearing are shown herein as pitch circles only. The nature of the coacting drive-surfaces can readily be seen in the associated side-views, such as FIGURE 2. In such construction, the torque is transmitted by way of gear teeth while the position of the gear components is accurately controlled by contact between the coacting friction surfaces. Accordingly, while it is well known that friction drive gearing may utilize pure rolling contact without the provision of teeth, nevertheless the additional torque capacity necessary in heavy duty drives is preferably provided by means of positive tooth connections. The advantages of bearingless construction and accurate positioning of the drive components afforded by rolling contact are provided by the combination arrangement shown, thereby providing a minimum weight, maximum torque system.

It will be apparent to those skilled in the art, that a substantially greater gear reduction ratio may be provided through utilization of more than one row of planet members. This is particularly true where the planet members utilized comprise compound planets as illustrated in FIGURE 1. In such planetary gear systems in which a fixed ring gear is provided, the ratio $$R = \frac{cx_1x_2x_3x_4}{ay_1y_2y_3y_4} + 1$$

where $a$=the radius of the sun member; $c$=the radius of the ring gear, $x$=the input radius of the individual planets of a given set (each set being noted by a different sub-designation, i.e., $x_1$, $x_2$, $x_3$, $x_4$, etc.) and $y$=the output radius of each planet member. From this formula relationship it will be observed that if the ratio $x/y$ were consistently to comprise approximately 2, the total ratio for a given planetary system employing a fixed ring gear and rotating planets would be approximately doubled with each successive additional set of planet members. Thus, a double set of planets, as for example, planets 11 and 12 of the illustrated embodiment of FIGURE 1, will provide a ratio easily twice that of a single planetary device. If the ratio $x_2/y_2$ is greater than 2, as is the case in the illustrated embodiment of FIGURE 1, the increase in over-all ratio R may be very substantially greater than twice the ratio of a system employing only a single set of planets. By the same token, utilization of three rows of planets, or four, or more, will, by operation of the mathematical formula above noted, provide increasing great ratio. Unfortunately, large numbers of sets of planet members provide very complicated mechanisms and it is preferred, accordingly, that the number of sets of planets be limited to three or less.

When it is desired that the planetary system embody two sets of planet members, it will be observed that an internally facing ring gear, as is conventionally employed with transmission systems employing only a single set of planet gears, provides an extremely inefficient system since the planet system must rotate in a direction reverse to the direction of rotation of the input sun member 10. It may be seen that the direction of rotation may be retained in the same direction as that of the input, sun member, if the output ring gear is provided with radially outwardly facing gear teeth, as at 16.

It has been found that provision of radially outwardly facing drive connection between ring gear 15 and the inwardly facing surface of planets 12 requires the addition of means for preventing the planets 12 from being flung outwardly as a result of centrifugal forces imposed on the system during its operation. In accordance with the principles of the present invention, the annular rings 17 co-operating with rotating surfaces 18 on planet 12 prevent radially outwardly directed movement of the planet 12. The members 17 freewheel and perform no drive functions. Accordingly, they perform no part of the ratio computations and provide force balancing means only. They are initially installed with an interference fit connection with the surfaces 18 sufficient to maintain the planets 12 in drive contact with the gear surfaces 16 during all conditions of load and speed for which the given gear system is designed.

In the embodiment illustrated in FIGURES 1 and 2, it will be observed that the spider or planet carrier 13 might be constructed sufficiently rigidly to prevent deformation of the system under centrifugal forces even without provision of rings 17. However, the provision of such rigidity would require, in the absence of rings 17, extremely great additional weight which may be almost completely eliminated through provision of the rings 17. Accordingly, it is preferred that the rings 17 be employed and that the planet carrier be constructed of a minimal weight of material sufficient to provide for the transfer of torque but clearly insufficient to accommodate the centrifugal forces which are balanced by the rings 17.

As explained above, with specific reference to my earlier copending application, the drive gears of the appbination illustrated in FIGURES 1 and 2 comprises combination positive tooth gearing and rolling contact. This may be more specifically seen in FIGURE 2. As there shown, the sun member 10 is provided with a smooth radially outwardly facing rolling contact surface 10a. The surface 10a has a diameter equal to the pitch diameter of the positive tooth gearing 10b formed on sun member 10 for co-operation with similarly formed teeth 11b on planets 11. Similarly, surface 11a on planets 11 has a diameter equal to the pitch diameter of the gearing 11b and, accordingly, planets 11 properly mesh and drive with the sun member 10. In turn, planets 12 are provided with a radially outwardly facing rolling contact surface 12a for contact with surface 11c of the planets 11. Gear teeth 12b co-operate with teeth 11b of planet 11, and since, as in the case previously described, surfaces 11c and 12a have diameters equal to the pitch diameters of their respective related gearing, rolling contact is maintained between planets 11 and 12 simultaneously with positive gear tooth drive connection. In turn, planets 12 are provided with teeth 12c for co-operation with the gear teeth 16 on the fixed ring gear 15.

In the structural relationship illustrated in FIGURE 2, it will be clear that independent support bearings are unnecessary for the rollers 11 since the rolling contact surfaces thereon co-operate in a bearing manner with the sun member 10 and with the planets 12. With a fixed ring gear 15 and rotatable carrier 14 it is necessary for the planets 12 to be rotatably mounted with respect to the carrier 14. This rotatable mounting is provided, in the form illustrated, by needle bearings 12d rolling on carrier stub shafts 13a.

As will be clear from a consideration of FIGURES 1 and 2, the gearing structure is illustrated without enclosing housings. In actual practice such housings are provided and would, of course, include support bearings for the shafts 10 and 14 as well as fixed support for the ring gear 15, as schematically illustrated at 15a.

In the structure illustrated in FIGURES 3 and 4, planetary gearing employing combined rolling and positive connections is illustrated. As will be seen, however, a significant difference is provided between the structure of FIGURES 3 and 4 and the structure shown in FIGURES 1 and 2, in the specific construction of the first set of planets 11. In the structure of FIGURES 3 and 4, the first set of planets comprises planet members 111 and 112. The roller surfaces 111a and 112a are identical, as are the dimensions of the teeth 111b and 112b. However, by providing the axial dimension 112e slightly greater than the total axial dimension 111e, it is possible to provide radial overlapping of planets 111 and 112. This is illustrated at the areas A in FIGURE 3. With this overlapping relationship, coupled with the necessary additional pair of gear teeth 110a required on the sun member 110, a very substantial increase in over-all output ratio of a multiple stage planetary system is possible. Thus, for the transmission of high loads in a two intermediate stage roller drive a practical ratio limit, without staggering, would approximate $R=70$. However, by staggering the first row of rollers, as illustrated in the embodiment of FIGURES 3 and 4, the ratio obtainable may exceed $R=100$. It will be observed that this overlapping arrangement may readily be utilized in the structure illustrated in FIGURES 1 and 2 with a very slight loss in axial compactness. It is intended, also, that utilization of this staggering technique be employed, whenever desired, with any of the modified forms of planetary apparatus hereinafter more fully set forth.

It will be understood by those skilled in the art that the structure specifically illustrated in FIGURES 3 and 4 is shown without an output connection. Power introduced by way of sun member 110 is passed through planets 111, 112 to planets 130. Planets 130 may, of course, be mounted as in FIGURE 2, upon a carrier rotatable about the axis of shaft 110, or fixed with a respective fixed or rotatable ring member 140 co-operating therewith. It will be understood, of course, that the specific form of output drive connection is unimportant to the staggered relationship comprising the basic disclosure of FIGURES 3 and 4.

In the embodiment illustrated in FIGURES 5 and 6, an arrangement of parts functioning in a manner related to that of FIGURES 1 and 2 is shown. As may be seen most clearly from FIGURE 6, the output is taken from the structure of FIGURE 6 by way of an annular ring member 218 having radially inwardly facing teeth 218a co-operating with the gear teeth 212a on planets 212. As will be apparent, member 218 bears substantially the same relationship to the planets 212 as the annular support rings 217 which are identical in function to rings 17 illustrated in FIGURE 2. With this structural arrangement, shaft 210 is shown as driving a plurality of planets 211, which in turn drive the second roll of planets 212, which react with fixed outwardly facing ring gear 215 secured in any conventional manner to a housing diagrammatically illustrated at 215a. This housing supports the input shaft 210 by way of bearings 215b and, similarly, supports the output shaft 214 by bearings 215c.

The reduction ratio R of the planetary system illustrated in FIGURES 5 and 6 is less than the reduction ratio provided by the system illustrated in FIGURES 1 and 2. In the system of FIGURES 5 and 6, $$R = \left[\frac{cx_1x_2}{ay_1y_2} + 1\right] \div \left[\frac{c}{d}+1\right]$$

where, as before, $a$ is the radius of the sun member and $c$ is the radius of the ring gear member. In this instance, $d$ comprises the radius of output gear 218, which rotates in the same direction as the shaft 210, and the annular supporting rings 217. It will be observed that the reduction ratio of movement between the input shaft and the annular rings 217 may be computed from the same general formula, substituting radius $e$ of the rings 217 for the radius $d$ of the ring 218. As shown by this formula, the rotational speed of the rings 217 is somewhat greater than the rotational speed of the output gear 218, as reflected by the fact that the ratio R for the rings 217 is less than the equivalent ratio for the output gear 218. It will be observed that the ratio R for the system shown in FIGURES 5 and 6 is less than the ratio R of the system illustrated in FIGURES 1 and 2 since $c/d$ is always less than 1. In fact, it will be clear that the ratio R of the system of FIGURES 5 and 6 is, accordingly, greater than one-half but less than equal to the ratio of the system of FIGURES 1 and 2 in which the output comprises the orbital speed of the planet clusters. While the reduction is less, systems such as illustrated in FIGURES 5 and 6 are high in efficiency. The stationary ring gears 215 and the output ring gear 218 are axially offset in a manner balancing against the support rings 217 providing zero moment with respect to the planets 212. A ratio on the order of $R=35$ is a practical maximum for systems in the form illustrated in FIGURES 5 and 6.

In the embodiment illustrated in FIGURES 7 and 8, three rows of planets are provided, the outermost of which co-operates with a radially inwardly facing fixed ring gear 315 rigidly secured as diagrammatically illustrated at 315a, to a support housing. Input shaft 310 drives, as in the preceding cases, by way of combined tooth and rolling drive connection, a first row of planets 311 which in turn drive a second row of planets 312 drivingly related to an outmost row of planets 313. Planets 313 carry annular support rings 317 similar in construction to the rings 17 and 217 previously discussed. The planets 313 contact the fixed ring gear 315 by way of teeth 313a and, in view of the fixed nature of the ring gear 315, rotate about the axis of the shaft 310 in the same direction of rotation as the shaft 310. The output of the system shown in FIGURES 7 and 8 is taken by way of shaft 314 having gear 314a in contact with the teeth 313a of planet 313.

The reduction ratio R of the system shown in FIGURES 7 and 8 is expressed by the formula $$R = \frac{cx_1x_2x_3}{ay_1y_2y_3} + 1 \div \left[\frac{c}{b}+1\right]$$

where $c$ corresponds to the radius of the ring gear 315, and $b$ comprises the radius of the output gear 314. In this instance, the output shaft 314 rotates faster than the planet clusters rotate about the axis of shaft 310. In the general relationship of the parts illustrated, this speed is slightly greater than twice the speed of the planet clusters. Since an over-all reduction ratio R equals greater than 200 may readily be obtained in a three planet system employing compound diameter planets, with the output taken from planets 313 (for example by way of a planet carrier of the type illustrated at 13 in FIGURE 2), the over-all ratio R obtainable in the system shown in FIGURES 7 and 8 may be up to approximately 100.

As in the case of the structures illustrated in FIGURES 4 and 6, the system illustrated in FIGURE 8 has eliminated support bearings for the planets. The floating rings 317 are of slightly greater diameter than the root diameter of the ring gear 315 in order to permit their simple assembly over the planets 315 prior to assembly of the planets and associated parts with the ring gear 315. Positioning of the rings 317 relative to the output shaft 314 and ring gear 315 provides, as in the case of the structure illustrated in FIGURE 6, a balanced or zero moment thereby minimizing bearing loads and preventing misalignment problems of the planet components which are, as above noted, supported entirely without the aid of special bearings.

As has been more thoroughly claimed in my copending application, Ser. No. 368,595 filed May 19, 1964 planetary systems of the bearingless type employing three rows of planet members, as in the case illustrated in FIGURES 7 and 8, are somewhat unstable due to the unequal distribution of forces by the second row of planets 312 against the third row of planets 313. In planetary systems employing solely rolling contact, this is a particular problem. In the systems of the type here illustrated, in which relative slipping of the rollers is prevented by means of the positive gear tooth connections, serious misalignment of the components is prevented. It may be desired, however, in some installations to assure maximum freedom of movement and stability, that the position of the second row of planets 312 be exactly controlled by provision of annular support rings (not shown) identical to rings 317 but contacting spaced cylindrical surfaces of planets 312. This same effect may be achieved by providing a radially slotted freely rotatable plate co-operating with the projecting ends of the planets 313 and rotatable with the planets about the axis of shaft 310, in the manner of a bearing race.

A differential type planetary system is illustrated in FIGURES 9 and 10, incorporating the principles of the present invention. As is well known, the efficiency of differential reduction gearing is less than nondifferential types. However, the efficiency penalty for differential reduction gearing is not unduly excessive if such reduction is not extremely high and, particularly, if the reduction is not achieved by way of reverse output rotation. One form of differential reduction gearing is illustrated in FIGURES 9 and 10, and a second form, employing three sets of planets, is illustrated in FIGURES 11, 12 and 13.

In the structure illustrated in FIGURES 9 and 10, two rows of planet members are employed. Input shaft 410 drives the first row of planets which in turn drives the second row of planets 412. The planets 412 react against the fixed radially outwardly facing ring gear member 415 which for balance purposes preferably co-operates with both ends of planets 412 as illustrated at 415a in FIGURE 10. The planets 412 are supported by free-wheeling ring members 417 similar to the rings 17, 217, and 317 previously described. Output is taken from the system by way of gear teeth 414a. The teeth 412b are on a fixed circle of smaller diameter than the teeth 412a and, accordingly, the output at shaft 414 is a differential output relative to the two diameters 415 (having a radius equal $c$) and 414a (having a radius equal $b$). In this system, the ratio $$R = \left[\frac{cx_1x_2}{ay_1y_2} + 1\right] \div \left[1 - \frac{by_3}{y_2c}\right]$$

where, as before, $c$ comprises the radius of the fixed reaction ring member, $a$ comprises the radius of the sun member and $b$ comprises the radius of the output member 414a, and where $y_2$ equals the output radius of planets 412 against the fixed ring member 415 and $y_3$ comprises the output radius of the planets 412 against the output member 414. From this formula it will be seen that as the factor $by_3/y_2c$ approaches 1 the over-all ratio R increases toward infinity.

The structural embodiment illustrated in FIGURES 9 and 10 is quite attractive since the reaction moment on the outside planets 412 is readily balanced as illustrated and, further, since the envelope or housing necessary to encompass the structure is extremely simple. In fact, the enveloping ring member 415 may be extended radially inwardly to provide bearing support for shafts 410 and 414, as illustrated.

In the embodiment illustrated in FIGURES 11, 12, and 13, a three planet row drive utilizing a fixed internal ring gear is shown. In the embodiment illustrated, this ring gear, 515, is supported at 515a by a fixed housing not shown and comprises pure rolling contact gearing. The sun member 510 co-operates with compound roller first planet members 511 which in turn co-operate with simple planet rollers 512 contacting the third row of planets 513. It will be seen that with the arrangement illustrated, $x_1$ is greater than $y_1$ while $x_2$ equals $y_2$ and $x_3$ equals $y_3$. On the other hand $y_4$ comprises a second output radius for the rollers 513 and provides, relative to $y_3$ a differential output in co-operation with the output shaft 514 carrying internally facing teeth 514a co-operating with teeth 513a of planets 513. Balancing support for the planets 513 is provided by means of the free wheeling planet set comprising floating sun roller 520 and free-wheeling planets 521, the arrangement of which is diagrammatically illustrated in FIGURE 13.

The ratio of the system illustrated in FIGURES 11, 12, and 13 is in no way affected, of course, by the support rollers 520, 521. The ratio $$R = \frac{cx_1x_2x_3}{ay_1y_2y_3} + 1 \div \left[1 - \frac{cy_4}{y_3b}\right]$$

where $b$ comprises the radius of the output gear teeth 514a and $c$ comprises the radius of the internally facing ring member 515. As in the case of the structure illustrated in FIGURES 9 and 10, as the factor $cy_4/y_3b$ approaches 1, the ratio R approaches infinity.

As above noted, the moment of forces applied against the planet rollers 513 is balanced or reduced to zero by means of a radially outwardly facing free-wheeling planetary system in the embodiment illustrated in FIGURES 11, 12, and 13. This is true since this balancing force must comprise a force acting radially opposite to the forces at ring member 515 and output member 514. Accordingly, it is impossible to employ internally facing ring members equivalent to free-wheeling rings 17. The function of such rings 17 is, however, readily accomplished by means of the free-wheeling planets 521 or, alternatively, although not shown, an annular ring free-wheelingly engaging the interior surface of the planets 513, as at 513b.

From the above description and drawings, it will be clear that I have provided a substantially improved planetary gearing system in which the forces acting against the output row of planets is balanced by means of free-wheeling planetary members in the form of annular rings or rotatable free-wheeling planetary rollers. As a result of the arrangement shown, a maximum compactness may be provided compatibly with maximum ratio change and maximum torque carrying capacity. At the same time, in most instances, it is possible to completely eliminate planet bearing members from the system thereby substantially increasing the over-all efficiency of drive transmission. It will be apparent to those skilled in the art that variations beyond those illustrated may readily be accomplished without departing from the scope of the novel concepts of my invention. Accordingly, it is my intention that the scope of the present invention be limited solely by that of the hereinafter appended claims.

I claim as my invention:

1. In combination in a planetary gear system, a sun gear, a plurality of free floating planets rotatably mounted in gear drive interconnection with said sun gear, a ring gear in gear drive contact with said planets at points of contact axially spaced from the point of gear drive interconnection, and a pair of annular free-wheeling support rings in friction drive relation with the radially outwardly facing surfaces of said planets for maintaining said planets in said drive interconnection with said sun gear, said annular support rings being axially spaced from each other to axially balance the drive interconnection with said sun gear.

2. In combination in a planetary gear system, a sun gear, a plurality of sets of planets one of which sets is free floatingly rotatably mounted in gear drive interconnection with said sun gear via at least one of the other sets of planets, a ring gear in gear contact with one of said sets of planets at points of contact axially removed from the point of contact of said planets with other planets and an annular free-wheeling support ring in friction drive relation with the radially outwardly facing surfaces of the radially outermost set of planets for maintaining all of said planets in drive interconnection with said sun.

3. In combination in a planetary gear system, a sun gear, a planet carrier, a plurality of sets of planets one of which sets is rotatably mounted on said carrier in gear drive interconnection with said sun gear via at least one free floating set of the other sets of planets, a ring gear in gear contact with one of said sets of planets at points of contact axially removed from the point of contact of said planets with other planets, and a pair of annular free-wheeling support rings in friction drive relation with the radially outwardly facing surfaces of the radially outermost set of planets for maintaining all of said planets in drive interconnection with said sun, said annular supporting rings being axially separated to axially balance the drive interconnection with said sun gear.

4. In combination in a planetary gear system, a sun gear, a planet carrier, a plurality of sets of planets rotatably mounted, one of said sets of planets being rotatably mounted on said planet carrier in gear drive interconnection with free floating planets in said other sets and with said sun gear, a ring gear having its radially outwardly facing surface in gear drive contact with said set of planets mounted on said planet carrier, and an annular free-wheeling support ring in friction drive relation with the radially outwardly facing surfaces of said set of planets mounted on said planet carrier for maintaining all of said planets in said drive interconnection with said sun and ring gear.

5. In combination in a planetary gear system, a sun gear, a plurality of sets of planets rotatably mounted, one of said sets of planets being rotatably mounted in gear drive interconnection with said sun gear and at least the other of the sets of planets being free floating, a ring gear having a radially outwardly facing surface in gear drive contact with said one set of planets and a pair of axially spaced annular free-wheeling support rings in friction drive relation with the radially outwardly facing surfaces of said one set of planets on axially opposite sides of said gear drive contact for maintaining all of said planets in said drive interconnection with said sun gear and ring gear.

6. In combination in a planetary gear system, a plurality of sets of free floating planet members, a sun member in drive relation with the radially innermost set of planet members, a ring member in drive relation with another of said sets of planet members, an output member in drive relation with said last named set of planet members at a point on the longitudinal axis thereof axially spaced from said ring member, and rotary free-wheeling rolling contact means in supporting contact with said last named set of planet members and acting to maintain said last named set of planet members in moment-balanced drive relation with said ring member and output member.

7. In combination in a planetary gear system, a plurality of sets of free floating planet members, a sun member in drive relation with the radially innermost set of planet members, a ring member in drive relation with another of said sets of planet members, an output member in drive relation with said last named set of planet members at a point on the longitudinal axis thereof axially spaced from said ring member, and rotary free-wheeling rolling contact means in supporting contact with said last named set of planet members and acting to maintain said last named set of planet members in moment-balanced drive relation with said ring member and output member, said last named means comprising at least one annular ring member.

8. In combination in a planetary gear system, a plurality of sets of free floating planet members, a sun member in drive relation with the radially innermost set of planet members, a ring member in drive relation with another of said sets of planet members, an output member in drive relation with said last named set of planet members at a point on the longitudinal axis thereof axially spaced from said ring member, and rotary free-wheeling rolling contact means in supporting contact with said last named set of planet members and acting to maintain said last named set of planet members in moment-balanced drive relation with said ring member and output member, said last named means comprising at least one ring member bearing against the radially outwardly facing cylindrical surface of said last named set of planet members.

9. In combination in a planetary gear system, a plurality of sets of free floating planet members, a sun member in drive relation with the radially innermost set of planet members, a ring member in drive relation with another of said sets of planet members, an output member in drive relation with said last named set of planet members at a point on the longitudinal axis thereof axially spaced from said ring member, and rotary free-wheeling rolling contact means in supporting contact with said last named set of planet members and acting to maintain said last named set of planet members in moment-balanced drive relation with said ring member and output member, said last named means comprising a set of free-wheeling planet rollers supporting said last named set of planet members.

10. In combination in a planetary gear system, a sun member, a plurality of planet members comprising at least one set of planets rotatably mounted in drive interconnection with said sun member, at least one ring member in drive interconnection with said planet members, at least the planet members of the set contacting said sun member each having compound diameters and having the large diameter portions thereof overlapping adjacent planet members of the same set.

References Cited
UNITED STATES PATENTS

| | | | |
|---|---|---|---|
| 1,859,462 | 5/1932 | Perkins | 74—801 |
| 1,970,251 | 8/1934 | Rossman | 74—801 |
| 2,076,926 | 4/1937 | Timmermann | 74—801 |
| 2,127,464 | 8/1938 | Chilton | 74—801 |
| 2,179,072 | 11/1939 | Chilton et al. | 74—801 |
| 2,896,480 | 7/1959 | Michie | 74—801 X |
| 2,944,444 | 7/1960 | Burns | 74—801 |
| 2,950,635 | 8/1960 | Bieger et al. | 74—801 |
| 3,008,355 | 11/1961 | Grudin | 74—801 |
| 3,216,270 | 11/1965 | Nasvytis | 74—801 |

DONLEY J. STOCKING, *Primary Examiner.*

DAVID J. WILLIAMOWSKY, *Examiner.*

J. R. BENEFIEL, *Assistant Examiner.*